E. A. WALKER.
Scroll-Saws.

No. 139,284.

Patented May 27, 1873.

Attest:
J. Mason Gozler
W. Colborne Brookes

Inventor:
Edward A. Walker
By N. Cranford
atty.

AM. PHOTO-LITHOGRAPHIC CO. N.Y. (OSBORNE'S PROCESS.)

UNITED STATES PATENT OFFICE.

EDWARD A. WALKER, OF MINNEAPOLIS, MINNESOTA.

IMPROVEMENT IN SCROLL-SAWS.

Specification forming part of Letters Patent No. 139,284, dated May 27, 1873; application filed March 31, 1873.

*To all whom it may concern:*

Be it known that I, EDWARD A. WALKER, of Minneapolis, in the county of Hennepin, in the State of Minnesota, have made certain Improvements in Scroll-Saws, of which the following is a specification:

The invention consists in the construction of the parts, whereby the adjustment of different parts of the machine is accomplished; also in the construction of a device by which the saw is raised in its upward reciprocation and kept in proper tension, and in the means by which the saw is attached to the sliding cross-head at its lower end, and in the construction of other parts, as willl be hereinafter more fully explained.

Figure 1:
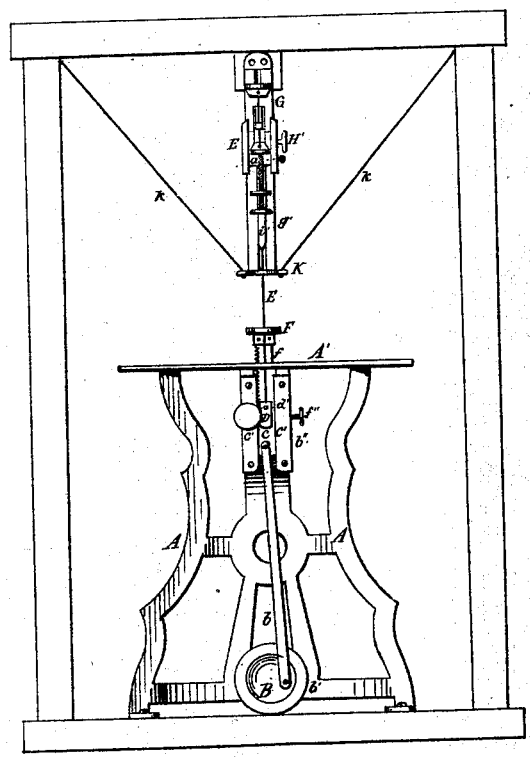
Figure 2:
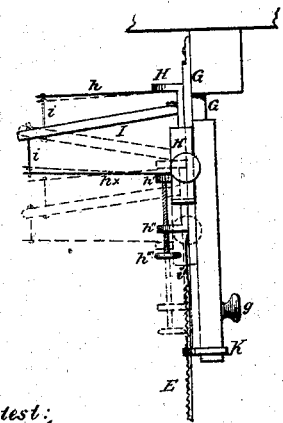
Figure 4:
Figure 3:
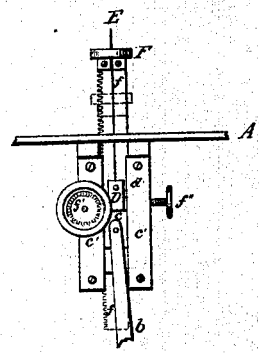

In the drawing, Figure 1 represents an upright front view of the machine; Fig. 2, enlarged details of the devices to which the upper end of the saw is attached, and which causes the saw to be raised upward; Fig. 3, enlarged details of parts; and Fig. 4 is an enlarged view of the upper side of saw-clamp.

A represents the saw-table frame or support, made fast to the floor of the building or other firm foundation. A', the saw-table or platen. B is a wheel on the main driving-shaft, in which is a crank or wrist pin, $b'$, on which works the lower end of the pitman $b$. The pitman $b$ is attached at its upper end to a cross-head, $c$, at $b''$, that slides between adjustable guide-ways $c'$. On the top of cross-head $c$, and fast thereto, is a clamp or case, D, triangular in horizontal section, with a screw tapped through its rear side and triangular jaws $d\ d$ within the case, as is seen in Fig. 4. This device is for securely holding the lower end of the saw E by placing the end of the saw in the opening between the jaws $d\ d$ and then turning in the screw to force the jaws $d$ forward. Their inclined outer sides, bearing against the inclined sides of the case D, will cause the jaws $d$ to press hard upon the sides of the saw and firmly clamp the saw therein. F is an adjustable saw-guide, working in a hole through the table A', and is attached to a rack-stem, $f$, that extends some distance below the table, and passing between plates to which the guide-ways $c'$ are attached, and has on one edge teeth or cogs. $f'$ is a pinion, the teeth of which gear into the teeth on the stem of guide F, and by turning the pinion in one direction the saw-guide F will be elevated and turn it in the other direction and will depress the guide. $f''$ is a holding-screw, to hold the adjustable guide at any desired point of elevation with relation to the saw-table. G is a flanged upright, firmly attached to the frame of the building or other fixed thing, and vertically thereon slides the frame H that contains the tension device, and the vibrating arm to which the flexible or yielding metal tape or other strap is attached at its upper end, while the lower end of the metal tape is attached to the upper end of the saw. $h$ and $h^\times$ are springs, projecting in nearly horizontal directions. The forward end of $h$ is attached to a projecting lug at the upper end of sliding frame H, and the forward end of spring $h^\times$ is firmly attached to a sliding block, $o$, that is free to slide within the frame H and to be held by holding-screw H'. I is a vibrating arm, firmly attached to the upper end of the flexible metal tape or other strap $i'$, which is attached at its lower end to the upper end of the saw. $i\ i$ are flexible links or rods, fast to the outer ends of the springs $h$ and $h^\times$, and to the outer ends of the vibrating arm I, but not at the same projection from the forward end of the vibrating arm, as is seen in Fig. 2, as one is attached at considerable distance further from the outer end of the arm than the other, in order to have the vibration of the arm or lever I to cause one link to be a fulcrum or purchase to the other, and thereby shorten their direct lengths and act upon the springs $h$ and $h^\times$, and make the end of the arm I and tape or strap $i'$ and saw E to rise when the crank is on the rising part of its revolution. Spring $h^\times$ is attached to a lug, $h'$, that is fast to the sliding block $o$. $h''$ is a lug, fast on the lower end of frame H, through which is tapped a temper-screw, $h'''$, and by turning the screw $h'''$ upward will slide block $o$, with the inner or forward end of spring $h^\times$, upward and change the tension upon the saw, when holding-screw H' will hold the block $o$ to its position and secure the tension of the springs upon the saw. K is a band, at the lower end of the upright, in which are attached brace-rods $k\ k$ that extend to the frame-work in order to keep the upright, and the parts connected with it and working on it, in a firm and unyielding position.

I am aware of the patent of S. C. Mason, dated June 21, 1870, and disclaim what is therein claimed; I am also aware of the patent of Jerome Mosely, dated April 25, 1871, and disclaim what is therein claimed.

Having thus described my invention, what I claim, and desire to secure by Letters Patent, is—

1. The saw-clamp, composed of the combination of the triangular case D, triangular jaws $d\ d$, and set-screw $d'$, substantially as and for the purpose shown and described.

2. The combination of springs $h$ and $h^\times$, vibrating arm I, and links $i\ i$ with the flexible band $i'$ and saw E, substantially as and for the purpose described.

3. The combination of the springs $h$ and $h^\times$, vibrating arm I, and links $i\ i$, flexible band $i'$, and saw E with the sliding adjustable frame H, substantially as and for the purpose described.

4. The combination of the temper-screw $h'''$, sliding block $o$, and spring $h^\times$ with the vibrating arm I, links $i\ i$, and spring $h$, substantially as and for the purpose described.

EDWARD A. WALKER.

Witnesses:
CHAS. H. WOODS,
GEO. W. CHOWEN.